United States Patent
Despesse et al.

(10) Patent No.: US 7,965,016 B2
(45) Date of Patent: Jun. 21, 2011

(54) METHOD AND DEVICE FOR CONVERTING MECHANICAL ENERGY INTO ELECTRICAL ENERGY

(75) Inventors: Ghislain Despesse, Saint Egreve (FR); Thomas Jager, Grenoble (FR); Jean-Jacques Chaillout, St Etienne de Crossey (FR)

(73) Assignee: Commissariat a l'Energie Atomique, Paris (FR)

( * ) Notice: Subject to any disclaimer, the term of this patent is extended or adjusted under 35 U.S.C. 154(b) by 321 days.

(21) Appl. No.: 12/161,469

(22) PCT Filed: Jan. 17, 2007

(86) PCT No.: PCT/EP2007/050435
§ 371 (c)(1),
(2), (4) Date: Jul. 18, 2008

(87) PCT Pub. No.: WO2007/082894
PCT Pub. Date: Jul. 26, 2007

(65) Prior Publication Data
US 2010/0133954 A1    Jun. 3, 2010

(30) Foreign Application Priority Data
Jan. 23, 2006  (FR) .................................. 06 50234

(51) Int. Cl.
*H02N 2/18* (2006.01)
(52) U.S. Cl. ......... 310/319; 310/309; 310/311; 310/321
(58) Field of Classification Search .................. 310/321, 310/319, 309, 311
See application file for complete search history.

(56) References Cited

U.S. PATENT DOCUMENTS
2,814,660 A   11/1957   Crownover
(Continued)

FOREIGN PATENT DOCUMENTS
EP   1 050 955 A1   11/2000
(Continued)

OTHER PUBLICATIONS

Jifeng Han, et al., "Novel Power Conditioning Circuits for Piezoelectric Micro Power Generators", Applied Power Electronics Conference and Exposition, 2004., vol. 3, XP-010703521, Feb. 22, 2004, pp. 1541-1546.
E. Lefeuvre, et al., "A comparison between several approaches of piezoelectric energy harvesting", J. Phys. IV France, vol. 128, XP-009069245, Sep. 2005, pp. 177-186.
Scott Meninger, et al., "Vibration-to-Electric Energy Conversion", IEEE Transactions on very Large Scale Integration (VLSI) System, vol. 9, No. 1, XP-011063135, Feb. 2001, pp. 64-76.
U.S. Appl. No. 12/809,733, filed Jun. 21, 2010, Despesse et al.

*Primary Examiner* — Thomas M Dougherty
*Assistant Examiner* — Bryan P Gordon
(74) *Attorney, Agent, or Firm* — Oblon, Spivak, McClelland, Maier & Neustadt, L.L.P.

(57) ABSTRACT

A method for converting mechanical energy into electrical energy by at least one piezoelectric element and at least one variable capacitor. The method: a) mechanically deforms the piezoelectric element; b) recovers charges produced by the deformation of the piezoelectric element; c) transfers the charges from the piezoelectric element to the capacitor; d) modifies the capacitance of the capacitor; and e) recovers at least some of the electrical energy. A device for converting mechanical energy into electrical energy includes a piezoelectric element and a variable capacitor. The piezoelectric element is capable of transferring charges to the capacitor.

17 Claims, 7 Drawing Sheets

U.S. PATENT DOCUMENTS

| | | | | |
|---|---|---|---|---|
| 4,054,826 A | * | 10/1977 | Wahlstrom | 322/2 A |
| 4,716,331 A | * | 12/1987 | Higgins, Jr. | 310/330 |
| 2001/0035723 A1 | * | 11/2001 | Pelrine et al. | 318/116 |
| 2004/0257165 A1 | * | 12/2004 | Lee et al. | 331/107 A |
| 2005/0093302 A1 | * | 5/2005 | Miyazaki et al. | 290/1 R |
| 2005/0099236 A1 | * | 5/2005 | Kawakubo et al. | 331/107 A |
| 2007/0074566 A1 | * | 4/2007 | Roundy et al. | 73/146 |

FOREIGN PATENT DOCUMENTS

WO     WO 2006/046938 A1     5/2006

* cited by examiner

METHOD AND DEVICE FOR CONVERTING MECHANICAL ENERGY INTO ELECTRICAL ENERGY

TECHNICAL FIELD AND PRIOR ART

This invention mainly relates to a method and a device for converting mechanical energy, especially vibrations, into electrical energy with improved efficiency.

The prior art discloses, for example in the document "Vibration-to-Electric Energy Conversion", Meninger, S.; Mure-Miranda, J. O.; Amirtharajah, R.; Chandrakasan, A.; Lang, J H; Very Scale Integration (VLSI) Systems, IEEE Transactions on, Volume 9, Issue 1, Feb. 2001 Page(s): 64-76, a device for recovering mechanical energy in the form of vibrations into electrical energy, comprising a plurality of capacitors of variable capacity, formed by two opposite elements respectively carried by a fixed comb and a moving comb, wherein the moving comb is moved by the effect of the external vibrations and modifies the gap between the two elements and thus the capacity of the capacitors.

Consequently, by generating electrostatic forces between the armatures of the capacitor, it is possible to recover electrical energy.

The prior art also discloses the use of a piezo-electrical material to transform mechanical energy into electrical energy, wherein the mechanical energy causes the deformation of the piezo-electric material and the appearance of electrical charges in the material, which may be recovered.

This recovery by electrostatic or piezo-electric means is not optimal.

Consequently this is the purpose of this invention, by proposing a method for recovering electrical energy from mechanical energy with improved efficiency with respect to the methods of the prior art.

It is also a purpose of this invention to propose a device to convert optimally mechanical energy into electrical energy.

DESCRIPTION OF THE INVENTION

The purposes described above are achieved by an energy conversion device featuring piezo-electric means capable of converting mechanical energy into electrical energy, associated to electrostatic means which amplify the electrical energy produced by the piezo-electric means.

In other terms, the conversion device associates a piezo-electric element and a capacitor of variable capacity, wherein the charges generated by the piezo-electric element during its deformation are transmitted to the capacitor, which by varying its capacity will amplify the electrical energy produced by the piezo-electric element.

The variation of the capacity is obtained by the relative movement of the armatures of the capacitor. When the capacity of the capacitor drops, the electrical charge creates electrostatic forces which tend to brake the movement of the armatures of the capacitor, thus transforming part of the mechanical energy into electrical energy. Consequently the electrical energy produced by the piezo-electric element during its deformation is amplified during the drop in capacity of the capacitor.

Advantageously, the structure for converting mechanical energy into electrical energy combines the principles of electrostatic and piezo-electric conversion in a synchronised manner. Indeed, if during the deformation of the piezo-electric element, there is a variation of capacity, it is possible to amplify by means of the electrostatic structure the energy acquired by the piezo-electric element, then possibly to re-inject it into the piezo-electric element for successive amplification. At each amplification phase, a braking force (electrostatic or piezo-electric) appears; it is stronger each time and thus permits more mechanical energy to be converted into electrical energy.

The variation of mechanical capacity used by the invention is not just a simple variation of capacity as may be the case with switched capacities, but a transduction of mechanical energy into electrical energy. Indeed, the switching of capacity disclosed in the prior art permits the electrical potential of an electrical energy source to be raised, but in no way its energy level. Indeed, the increase in the voltage induces a drop in the output current which maintains a mean output power equal to the mean input power, wherein the voltage-current product remains constant, this is an electrical/electrical energy conversion and in no way a mechanical/electrical conversion. On the other hand, thanks to this invention, with a drop in capacity due to mechanical deformation, not only is the electrical potential increased, but also the electrical energy stored; the mechanical energy provided to deform the capacity is in fact transformed into electrical energy thus amplifying the electrical energy initially stored in the capacity.

With a drop in capacity by mechanical deformation, the electrical energy is amplified, whereas with a switched capacity system such as that described in the document EP 1 050 955, only the voltage is amplified. In the case of this invention, when the mechanical capacity is deformed and drops in value whereas the charge stored Q on its electrodes remains constant (circuit temporarily open), the voltage U, which is equal to the charge stored Q divided by the value of the capacity C, increases, and in the same way, the electrical energy stored $$E_{capa} = \frac{1}{2}QU$$

increases when U increases, which is to say when C drops.

$$E_{capa} = \frac{1}{2}CU^2 = \frac{1}{2}QU = \frac{Q^2}{2C}$$

Therefore when Q is constant and the capacity C drops, $E_{capa}$ increases.

A switched capacity system, which for example passes capacities in parallel to in series behaves differently than a variation of capacity by mechanical variation. Indeed, when the capacities are in parallel, the charge is spread over the capacities, and placing them in series does not modify this distribution, the equivalent capacity indeed drops but only part of the charge is found at the external terminals.

Placing ten identical pre-charged capacities in series provides a voltage multiplied by 10, but also to an equivalent charge divided by 10 and unchanged stored energy ½QU. This is natural because no external energy has been added to the system.

Within the scope of this invention, the energy converted by the mechanical variation of the capacity is therefore significant with respect to the energy converted by the piezo-electric element.

Preferably, an extreme capacity of the electrostatic element corresponds to an extreme voltage at the terminals of the piezo-electric element. Using simple electronic means, the energy converted by the piezo-electric element may be efficiently transferred to the electrostatic element when the capacity value is at maximum. This energy is then amplified during the phase when the capacity drops.

Indeed, if in addition to the synchronisation between the electrostatic conversion and the piezo-electric conversion, at each extreme value of capacity on the electrostatic structure an extreme deformation of the piezo-electric element occurs, then these amplification phases may be optimised. When the deformation is at maximum, the potential electrical energy stored in the piezo-electric element is simply transferred to the electrostatic structure which has a maximum capacitive value. Then, when the electrostatic structure passes from its maximum capacitive value to its minimum value, there is an increase in the potential electrical energy within this structure. When this potential energy is at maximum, it is either transferred to a storage circuit (battery) or it is re-injected into the piezo-electric element so that it is once again amplified.

The system may be used to recover mechanical vibration energy in everyday environments (automobile, machine tools, etc.), of the order of a few microwatts per gram of moving mass with an efficiency of around 20%.

The device according to the invention furthermore permits advantageously to start without the need for an initial source of electrical energy, while conserving the advantages of electrostatic structures in terms of small mechanical/electrical coupling.

The main purpose of the invention is therefore a method of converting mechanical energy into electrical energy, by means of at least one piezo-electric element and at least one capacitor of variable capacity, wherein said method comprises the steps:

a) of mechanical deformation of the piezo-electric element, b) of recovery of the charges produced by the deformation of the piezo-electric element, c) of a transfer of charge from the piezo-electric element to the capacitor, d) of modification of the capacity of the capacitor, e) of recovery of at least part of the electrical energy.

Advantageously, the deformation of the piezo-electric element and the modification of the capacity of the capacitor are simultaneous.

Furthermore, also very advantageously, the deformation of the piezo-electric element is at maximum when the capacity of the capacitor is at maximum.

The capacity is, for example, modified by mechanical deformation of the capacitor. The piezo-electric element and the capacitor may thus be deformed by a same mechanical constraint.

It may be provided that part of the electrical energy converted by the capacitor is transmitted to the piezo-electric element.

The charges may also be transferred to a first or a second capacitor depending on a direction of deformation of the piezo-electric element.

It may also be provided that, when a voltage at the terminals of the piezo-electric element is at maximum, its sign is inverted to create a mechanical braking force permitting the energy converted to be increased in a following conversion cycle.

Furthermore, the method according to the invention may comprise the additional step of transferring the electrical energy produced by a capacitor to a second capacitor and inversely until a predetermined level of amplification of the electrical energy is reached.

A quantity of excess energy with respect to said amplification is then transferred to a storage or operational unit.

Very advantageously, the transfer of charges of step c) is controlled by a diode or a switch fitted with a control circuit.

Another purpose of this invention is a device for converting mechanical energy into electrical energy, comprising at least one piezo-electric element and at least one capacitor of variable capacity and means of controlling the transfer of charges between the piezo-electric element and the capacitor, such that the charge produced during a deformation of the piezo-electric element is transmitted to the capacitor to generate electrical energy amplified by variation of its capacity.

The means of controlling the transfer of charges are advantageously formed by at least one diode or at least one switch fitted with a control circuit.

The capacity of the capacitor is, for example, modified by moving towards one another the armatures of the capacitor.

The piezo-electric element and the armatures of the capacitor are advantageously substantially parallel so that they are subjected to the same mechanical constraint.

The device according to the invention may comprise two capacitors whose capacities vary inversely.

In one embodiment, the device according to the invention comprises a part that moves by the application of a mechanical constraint, fitted with teeth on either side of its axis of movement, wherein two fixed parts also equipped with teeth move opposite the teeth of the moving part, wherein the piezo-electric elements are perpendicular to the movement of the moving part and are electrically connected to the moving part, wherein the pairs of opposite teeth form two sets of capacitors in series whose capacities vary inversely.

In another embodiment of the device according to the invention, the piezo-electric element is in the form of a flexible membrane suspended at a distance from an electrostatic electrode, so that the electrostatic electrode and a second electrode of the piezo-electric element form a capacitor of variable capacity by deformation of the membrane.

The device according to the invention may also comprise a stratified structure in which the capacitor is formed by an alternation of first electrodes with a first potential, layers of electrically isolating material and second electrodes with a second potential, wherein the electrically isolating material is elastically deformable and in which the piezo-electric element forms a layer of the stratified structure.

The piezo-electric element advantageously comprises a layer of piezo-electric material and a first and a second electrode on either side of the layer of piezo-electric material.

The piezo-electric material may be chosen from the ceramics: PZT ($PbZrtiO_3$) or PLZT (with lanthane) or $BaTiO_3$, from the nano-crystals (PZN-PT or PMN-PT), from the polymers (PVDF) or AFCs (Active Fibre Composites).

BRIEF DESCRIPTION OF THE DRAWINGS

Other characteristics and advantages of the invention will be more clearly understood upon reading the following description, made in reference to the appended drawings, in which.

DETAILED DESCRIPTION OF SPECIFIC EMBODIMENTS

Throughout the description, by "deformable" it is meant an element that is capable of elastically deforming under a given charge, wherein the material of the element is chosen to suit the constraints to which the recovery device is likely to be subjected.

Figure 1A:
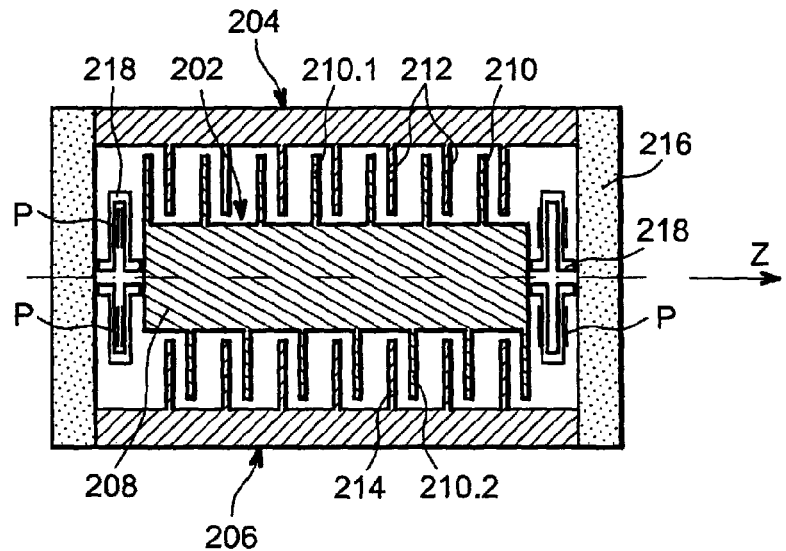
FIG. 1A is a top view of a diagrammatical representation of one embodiment of a device according to the invention.
Figure 1B:
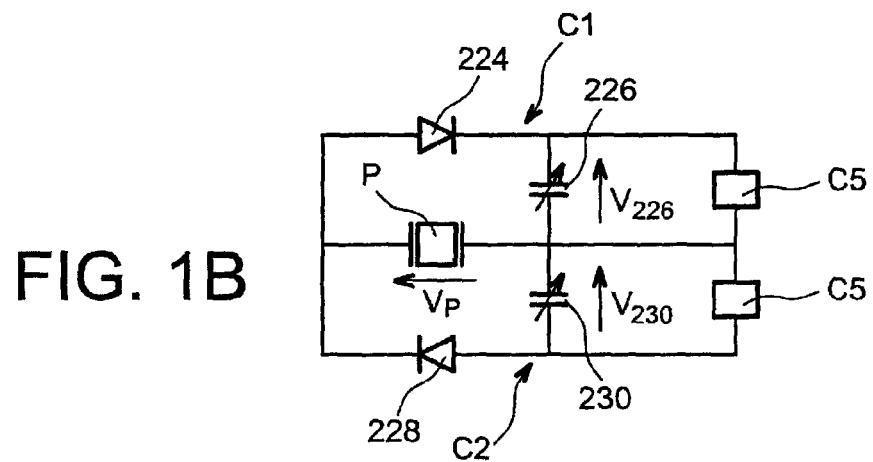
FIG. 1B is an example of an electrical diagram corresponding to the device of FIG. 1A.

FIGS. 1A and 1B show an embodiment of the invention comprising a moving part 202 and two fixed parts 204, 206 surrounding the moving part 202, wherein the moving and fixed parts are intermeshed.

The fixed parts and the moving part are made from conductive material.

The moving part 202 comprises a body 208 with a Z axis fitted with a plurality of teeth 210 extending on either side of the Z axis and perpendicular to it. The fixed parts 204, 206 are parallel to the Z axis and comprise teeth 212, 214 perpendicular to the Z axis. The teeth 212 of the fixed part 204 are opposite the faces 210.1 located on the right of the teeth 210 in the drawing and the teeth 214 are opposite the faces 210.2 located on the left of the teeth 210 in the drawing.

The moving part 202 may move along the Z axis towards the right and towards the left. Thus, when the moving part 202 moves towards the right, the teeth 210 move away from the teeth 212 and move closer to the faces 214. When the moving part 202 moves towards the left, the teeth 210 move closer to the teeth 212 and away from the teeth 214.

The moving part 202 is connected to a carrier 216 by deformable arms 218, so as to authorise the movements along the Z axis. As concerns the fixed parts 204, 206, they are connected rigidly to the carrier 216.

Piezo-electric elements P are located on the arms 218 so that they may also be deformed when the moving part 202 moves; electrically, they may be in series or in parallel. The piezo-electric elements P comprise a piezo-electric material and two electrodes on either side of the piezo-electric material.

All of the teeth 212 of the fixed part 204 and the teeth 210 of the moving part 202 form a first series of capacitors, whose capacity increases when the moving part 202 moves towards the right.

All of the teeth 214 of the fixed part 206 and all of the teeth 210 of the moving part 202, opposite, form a second series of capacitors whose capacity increases when the moving part 202 moves towards the left.

In the rest of the description, we will consider that when the moving part 202 moves towards the right, the voltage $V_P$ at the terminals of the piezo-electric element increases and when the moving part moves towards the left, the voltage $V_P$ at the terminals of the piezo-electric element drops.

FIG. 1B shows an example of an electrical circuit that may be associated to the device of FIG. 1A. The electrical circuit is composed of two sub-circuits C1, C2. The first sub-circuit C1 comprises the piezo-electric element P, mounted in series with a first diode 224 and a first capacitor 226 of variable capacity $C_{226}$. The capacitor 226 represents the capacitor equivalent to the succession of capacitors formed by the teeth 210 and 212. The second sub-circuit C2 comprises the same piezo-electric element 22 also mounted in series with a second diode 228 and a second capacitor 230 of variable capacity $C_{230}$. The second capacitor represents the capacitor equivalent to the capacitors formed by the teeth 210 and 214. The first 224 and second 228 diodes are mounted opposite one another to allow each one to have the passage of a current in the opposite direction.

Consequently, when the voltage $V_P$ at the terminals of the piezo-electric element P increases, the diode 224 allows current to pass, and when voltage $V_P$ at the terminals of the piezo-electric element P drops, it is the diode 228 which allows current to pass.

In the example shown, the circuits C1 and C2 are each connected to a storage unit C5 or to a distinct application, but they may be connected to the same unit or the same application.

We will now describe the operation of this device.

When the carrier 216 is subjected to mechanical vibrations, the moving part moves along the Z axis from left to right. The movement of the moving part causes the deformation of the piezo-electric element P. A voltage then appears at its terminals, and the charges produced are then transmitted to one of the capacitors of variable capacity, which amplifies the electrical energy recovered due to the variation of the capacity and the variation of the potential at its terminals.

Consequently, in each direction of movement, a piezo-electric element P is deformed, causing the mechanical energy to be converted into electrical energy.

In the example shown, the means of controlling the charge transfer are formed by the diodes 224, 228, however switches equipped with a control circuit could be provided for example.

In the case of a diode, this transfer is carried out continuously from a minimum charge value. Whereas in the case of a control switch, this transfer is carried out in a single operation when the potential between the electrodes of the piezo-electric element is at maximum. The switch must be controlled inversely to the diodes, which switch automatically to allow current to pass.

Figure 1E:
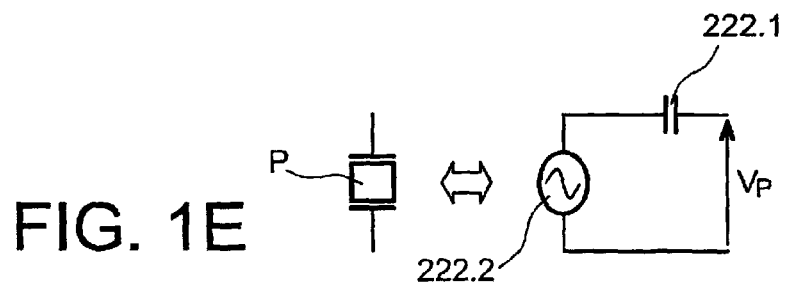
FIG. 1E is a model of the operation electrical of a piezo-electric element.

FIG. 1E shows an electrical diagram which shows a simplified model of the electrical operation of a piezo-electric element.

This circuit comprises a capacitor 222.1 of capacity $C_P$ and an alternative voltage generator 222.2 formed by the deformed piezo-electric material.

Figure 1C:
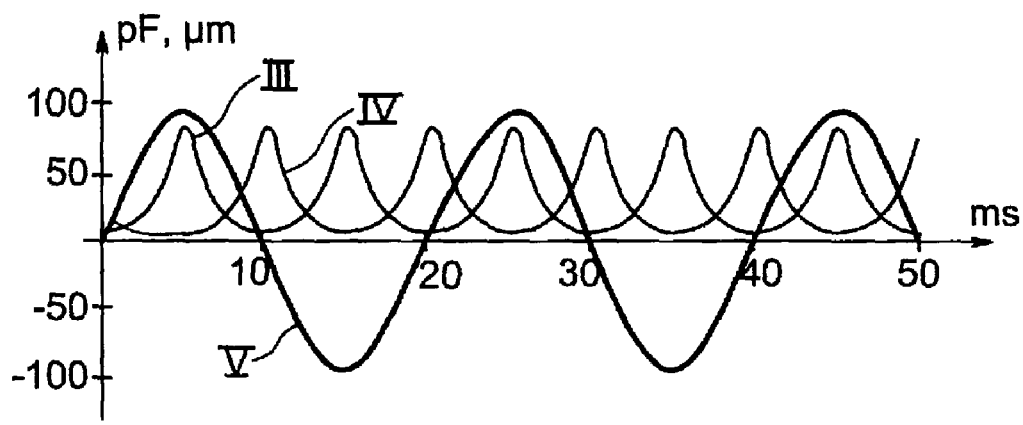
FIG. 1C shows the variations of capacities in picofarads of the capacitors of the device of FIGS. 1A and 1B in function of time in milliseconds when the piezo-electric element is deformed, as well as the deformation in micrometers of the piezo-electric element.

FIG. 1C shows the variations of the capacities at the terminals of the capacitors 226 (curve III), 230 (curve IV), and the deformation of the piezo-electric element (curve V) in function of time.

Figure 1D:
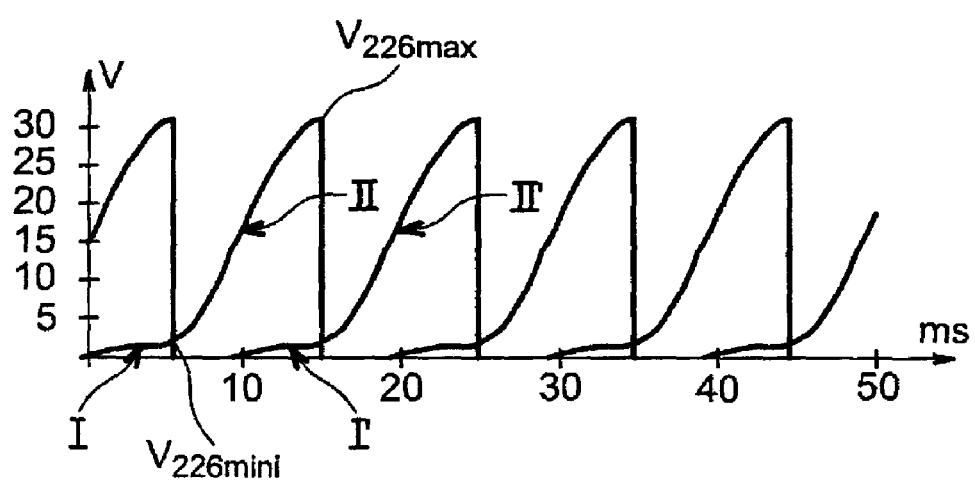
FIG. 1D shows the variations of the potential at the terminals of the capacitors of the device of FIGS. 1A and 1B in function of time when the piezo-electric element is deformed.

FIG. 1D shows the variation of the potential at the terminals of capacitors 226 (curve I, II) and 230 (curve I', II').

When the moving part 202 moves towards the right, the piezo-electric element P is deformed and the voltage Vp at the terminals of the piezo-electric element P increases and renders the diode 304 conductive (part I, FIG. 1D). The voltage $V_{226}$ at the terminals of the capacitor 226 therefore follows the voltage Vp by a progressive transfer of the electrical charges stored in the capacitor P.1 of the piezo-electric element of FIG. 1B to the capacitor 226. Then, when the deformation of the piezo-electric element reaches a maximum value, the voltage Vp at the terminals of this element starts to drop whereas the voltage $V_{226}$ on the contrary increases (part II of FIG. 1D), which causes the diode 224 to block. This increase of $V_{226}$ is due to the fact that when the moving part 202 moves towards the left, the capacity $C_{226}$ drops (part II', FIG. 1D), and the capacitor 226 is then electrically isolated from the rest, due to the blocking of the diode 224, wherein its charge $Q_{226}=C_{226}V_{226}$ remains constant. If this charge $Q_{226}$ is constant and the capacity $C_{226}$ drops, then the voltage $V_{226}$ increases. When the voltage $V_{226}$ reaches a maximum value, a classic discharge circuit (Flyback type structure or other) may be used to transfer the energy of this charge to the storage unit C5 or directly to the application to be powered.

The electrical energy $E_{226}$ acquired during this phase where the capacity $C_{226}$ decreases is equal to $½Q_{226}(V_{226max}-V_{226min})$ or even $½Q_{226}(1/C_{226min}-1/C_{226max})$. The charge $Q_{226}$ is the charge transferred by the piezo-electric element P to the capacitor 226 up until the voltage at the terminals of the piezo-electric element starts to drop (start of part II, FIG. 1D); the voltage $V_{226max}$ is the voltage at the terminals of the capacitor 226 at the end of part II (FIG. 1D); the voltage $V_{226min}$ is the voltage at the terminals of the capacitor 226 at the start of part II (FIG. 1D); the capacity $C_{226min}$ is the capacity of the capacitor 226 at the end of part II (FIG. 1D); the capacity $C_{226max}$ is the capacity of the capacitor 226 at the start of part II (FIG. 1D).

To detect the extreme voltage values at the piezo-electric element P or the electrostatic structure, it suffices for example to detect the passage of the drift of this voltage from a positive value to a negative value.

Furthermore, the device advantageously offers symmetry, thus a similar operation intervenes in the circuit C2 when the voltage Vp becomes negative, which is to say when the moving part 202 moves towards the left. This construction symmetry thus permits energy to be recovered in both directions of movement. It is possible to provide a single circuit if desired.

Advantageously, it is provided that the voltage $V_P$ at the terminals of the piezo-electric element is at maximum when the capacity of the capacitor 226, 230 is at maximum. The conversion is thus optimised, as the values of the voltages $V_{226}$ to calculate the electrical energy converted are the extreme values at the terminals of the capacitor 226.

Indeed, if the voltage Vp of the piezo-electric element P was at maximum before or after the capacity $C_{226}$ of the capacitor 226, the values of the voltages $V_{226}$ at the terminals of the capacitor 226 would not be the extreme values, but values in part II (FIG. 1D) in the interval $]V_{226min};V_{226max}[$.

Again advantageously, the conversion carried out by the piezo-electric element and the conversion carried out by the capacitors 226, 230 are synchronised, as the deformation of the piezo-electric element P and the capacitors 226, 230 result from the same external mechanical efforts, wherein the latter cause the appearance of a difference in potential at the terminals of the piezo-electric element, and the variation of capacity of the capacitors 226, 230.

The device according to the invention furthermore has the advantage, with respect to an electrostatic system of the prior art, of being able to start without the need for an initial electrical energy source, as this is provided by the piezo-electric element when it is deformed by the moving part 202.

Furthermore, the active charge cycle of the prior art is a source of electrical losses due to the consumption of the electrical circuit, which permits the energy to be taken from a storage unit that is already charged, to detect the charge instant of the capacity and to inject this energy into the device. According to the invention, the active charge cycle is advantageously replaced by a totally passive and naturally synchronised charge cycle. As the energy conversion is mainly carried out via the electrostatic structure, the piezo-electric element, whose main purpose is to inject a small initial charge into the electrostatic structure, does not need to be very efficient.

Figure 2A:
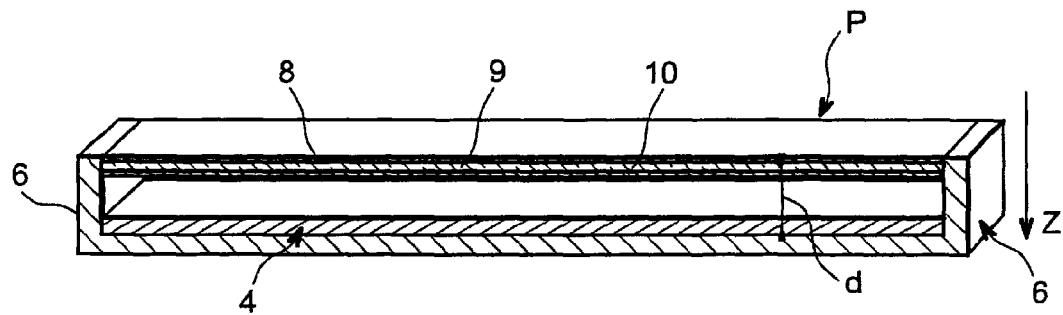
FIG. 2A is a diagrammatical representation in perspective of another embodiment of an energy recovery device according to the invention.

FIG. 2A shows another embodiment of a device according to the invention, comprising a piezo-electric element P and an electrostatic electrode 4. The piezo-electric element P and the electrode 4 are substantially parallel and separated by a dielectric material, for example air. The piezo-electric element P and the fixed electrode 4 are attached by their longitudinal ends to a carrier 6. The piezo-electric element P and the fixed electrode 4 are electrically isolated.

The piezo-electric element P comprises a piezo-electric material 9, for example a membrane made of piezo-electric PVDF type polymer, a first 8 and a second 10 electrode on either side of the membrane. The second electrode 10 is opposite the fixed electrode 4 so as to form a capacitor 12.

The piezo-electric element P is capable of deforming when a mechanical charge is applied in the Z direction, wherein this deformation causes a movement of the second electrode 10 and thus a variation of the distance d between the fixed electrode 4 and the moving electrode 10. The capacitor 12 therefore has a capacity which varies with the application of a mechanical effort on the membrane 9.

Figure 2B:
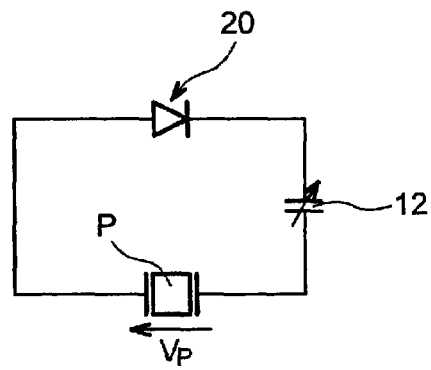
FIG. 2B is a basic principle electrical diagram of a device according to the invention.

FIG. 2B shows a basic principle electrical diagram of a device according to the invention, for example the device of FIG. 1A. Means of controlling the charge transfer 20 are fitted to the circuit. These means are, for example of the diode or switch type and are fitted with a control circuit. These means 20 authorise the charge transfer of the piezo-electric element P to the capacitor 12.

When an effort is exerted on the piezo-electric element P in the Z axis, the piezo-electric membrane 9 is deformed, causing the appearance of an electrical potential between the first 8 and second 10 electrodes. This deformation of the piezo-electric element P causes the second electrode 10 and the fixed electrode 4 to move towards one another, and an increase in the capacity of the capacitor 12.

The operation is identical to that described in relation to FIGS. 1A to 1E.

The charge generated by the deformation of the piezo-electric element P is transferred to the capacitor 10. Then, when the effort is no longer exerted on the piezo-electric element P, the capacitor regains its rest position, and the electrodes 4 and 10 move away from one another causing a drop in the capacity.

This capacity variation associated to a variation of the potential at the terminals of the capacitor 12, permits electrical energy to be recovered that may be stored or directly used by a determined application.

The deformation of the piezo-electric element P is synchronised with the capacity variation of an electrostatic element, as it is the same external mechanical energy which causes the variation in capacity and the deformation of the piezo-electric element.

This device may, for example be used to recover the energy from pressure or impacts that may be exerted on a membrane, such as that resulting from pressing a switch . . . , the pressure variation of a gas, the pressure variation of a blood vessel, or even a drop of rain falling onto the piezo-electric element.

Figure 3:
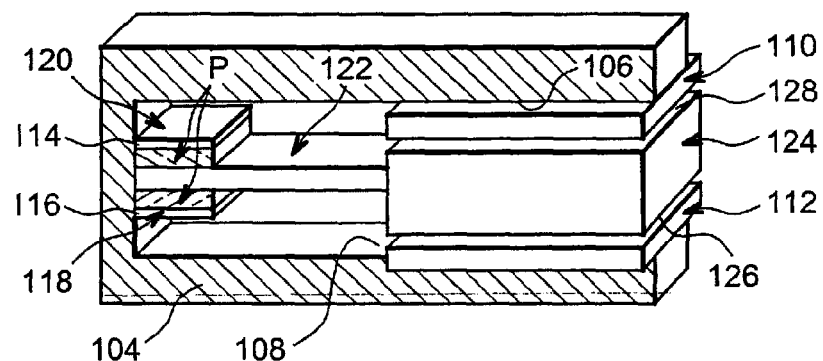
FIG. 3 is a diagrammatical representation in perspective of another embodiment of this invention.

FIG. 3 shows another embodiment of a device according to the invention comprising a carrier 104 with an elongated U shape, whose inside ends 106, 108 of the branches carry electrostatic electrodes 110, 112 opposite one another. The device also comprises a piezo-electric element P fixed to the bottom of the U. The piezo-electric element P comprises two parts 114, 116 made of piezo-electric material respectively comprising on their external face an electrode 118, 120 attached by their internal face to a first end of a beam 122 made of conductive material extending in parallel to the branches of the U. The beam comprises at its second end a moving mass 124 positioned between the electrostatic electrodes 110, 112. The mass 124 comprises conductive faces 126, 128 respectively opposite electrodes 110, 112, and separated from them by a dielectric material, for example air.

The faces 126, 128 and the electrodes 110, 112 respectively form capacitors, whose capacity may vary when the mass 124 moves between the branches of the U.

Consequently, the device may be used, thanks to the inertia of the moving mass 124, to recover electrical energy if the carrier 104 is subjected to mechanical vibrations. When the carrier 104 is subjected to mechanical vibrations, the mass 124 oscillates between the branches of the U, causing a deformation of the piezo-electrics parts 114, 116 and therefore the appearance of an electrical potential between the electrodes 118,120 and the common electrode 122 and simultaneously a variation of the capacity of the capacitors.

As the beam is conductive, the potential of the electrode 122 is in the electrodes 1126, 128.

It is therefore possible to recover electrical energy by associating an electrical circuit, for example that of FIG. 1B.

The operation is identical to that of the device of FIG. 1A.

Figure 4:
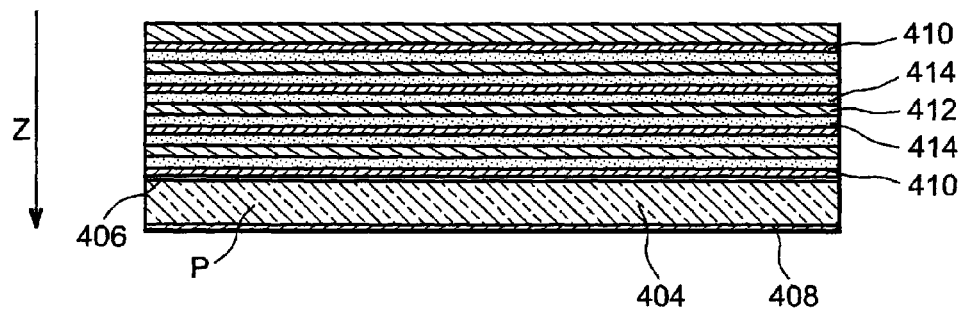
FIG. 4 is a diagrammatical representation of another embodiment of this invention.

FIG. 4 shows another embodiment of a device for converting a mechanical constraint into electrical energy, with a sandwich structure formed by a plurality of layers.

The device comprises a piezo-electric element P equipped, on either side of a piezo-electric material 404, with electrodes 406,408. The device also comprises a multi-layer structure comprising first conductive layers 410 with a same potential $U_{410}$ alternated with second conductive layers 412 with a same potential $U_{412}$, separated by deformable isolating layers 414. This structure is deposited on the piezo-electric element.

The potential $U_{410}$ is different from the potential $U_{412}$.

The first 410 and second 412 conductive layers form with the isolating layers 414, a succession of capacitors of variable capacity, that are electrically in parallel.

The electrode 406 is in electrical contact with the electrode 410.

One side opposite that of the piezo-electric element is designed to receive a variable mechanical constraint in the Z direction.

When a constraint is applied to the sandwich, there is an increase in the potential electrical energy at the terminals of the piezo-electric element P and an increase of the electrostatic capacity by the layers 410, 412 moving towards one another. These layers 410, 412 can move towards one another due to the choice of a very flexible electrical insulator, for example rubber, which under the force of the constraint will allow the layers 410, 412 to move towards one another.

As for the device of FIG. 1A, the electrical energy produced by the piezo-electric element P is transferred to the capacitor 416 when it is at maximum. The potential electrical energy is then amplified when the constraint applied to the device is released.

During the compression, the piezo-electric element converts part of the mechanical energy into electrical energy and when the constraint is released, it is the capacitor or the electrostatic part which amplifies this conversion.

Electrostatic structures may also be mentioned. Indeed, when the conductive layers 410, 412 are brought closer to one another, they receive an electrical charge from the piezo-electric element P. This electrical charge then creates electrostatic forces which tend to prevent the conductive layers from moving away from one another, thus transforming part of the potential mechanical energy acquired during the compression into potential electrical energy. This acquired potential electrical energy may be used to power an electronic circuit, an actuator or an energy storage unit.

Figure 5A:
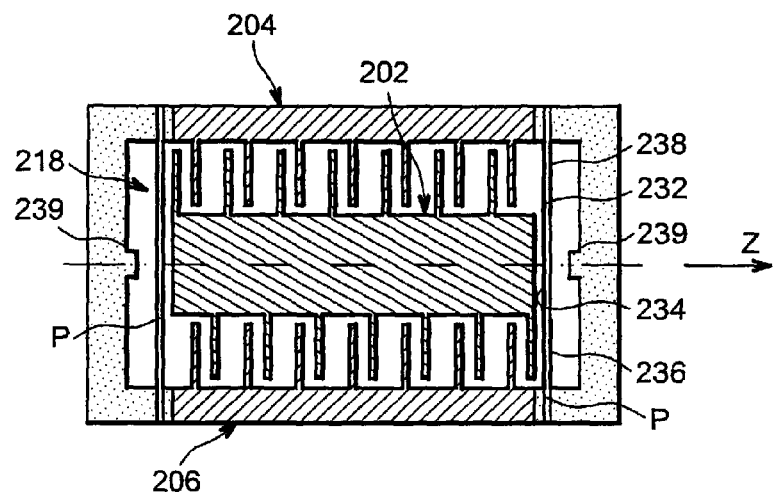
FIG. 5A is a diagrammatical representation of another embodiment of this invention.
Figure 5B:
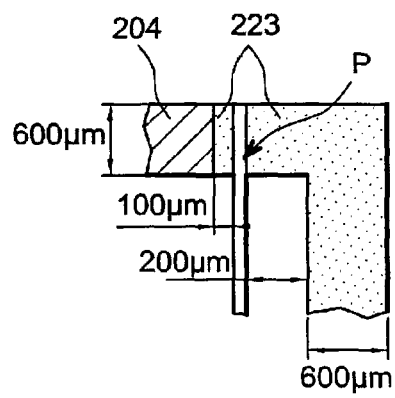
FIGS. 5B and 5C are detailed views of the device of FIG. 5A.
Figure 5C:
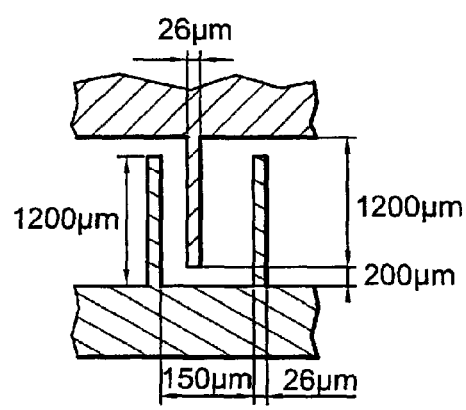

FIGS. 5A, 5B and 5C show a representation of a practical embodiment of a device according to the invention with a similar form to that of the device of FIG. 1A.

For reasons of simplification, we will use the same references as those used in FIG. 1A.

The arms 218 are formed by the piezo-electric elements P extending perpendicularly to the axis of movement Z across the entire the width of the carrier. The piezo-electric elements P are for example embedded by their ends between the carrier and the fixed parts 204, 206, as may be seen in the detailed view of FIG. 5B. A layer 223 of electrically isolating material is interposed between the piezo-electric elements P and the fixed parts 204, 206. The piezo-electric elements comprise an electrode 234 positioned on one side of a piezo-electric material 232, wherein this electrode is electrically connected to the moving part 202, and two electrodes 236, 238 positioned on the other side of the piezo-electric material 232.

The electrodes 236, 238 are connected together to a same electrical potential.

The device advantageously comprises stops 239 to avoid a short circuit by contact between the teeth at the end of their travel.

It may be noted that the energy conversion device may comprise a greater number of teeth than shown.

The dimensions shown in FIGS. 5A to 5C are provided solely by way of example and are in no way restrictive.

The moving part 202 has a width of 300 μm and a length of 7000 μm. The teeth are spaced at a distance of 150 μm and have a height of 1200 μm. The device may have a thickness of 400 μm, comprise 46 teeth on each side of the moving part 202 and weight approximately 1 g. The gap between the teeth may vary between 1 μm and 50 μm.

When the moving part 202 moves towards the right of the drawing in the Z direction with respect to the fixed parts 204, 206, this causes an increase in the capacity between the moving part 202 and the fixed part 204, and a drop in the capacity between the moving part 202 and the fixed part 206. There is also at the same time a deformation, especially elongation, of the piezo-electric elements P.

We consider that the electrodes 234 of the piezo-electrical elements have the same electrical potential as the moving part 202.

When the piezo-electric elements P are elongated, we consider that by symmetry the potentials of the electrodes 236, 238 increase in the same way and may be connected together to an electrical potential V.

The system may be made partially or totally using microelectronic technologies or at a larger scale using standard manufacturing techniques (machining, casting or other).

Figure 5D:
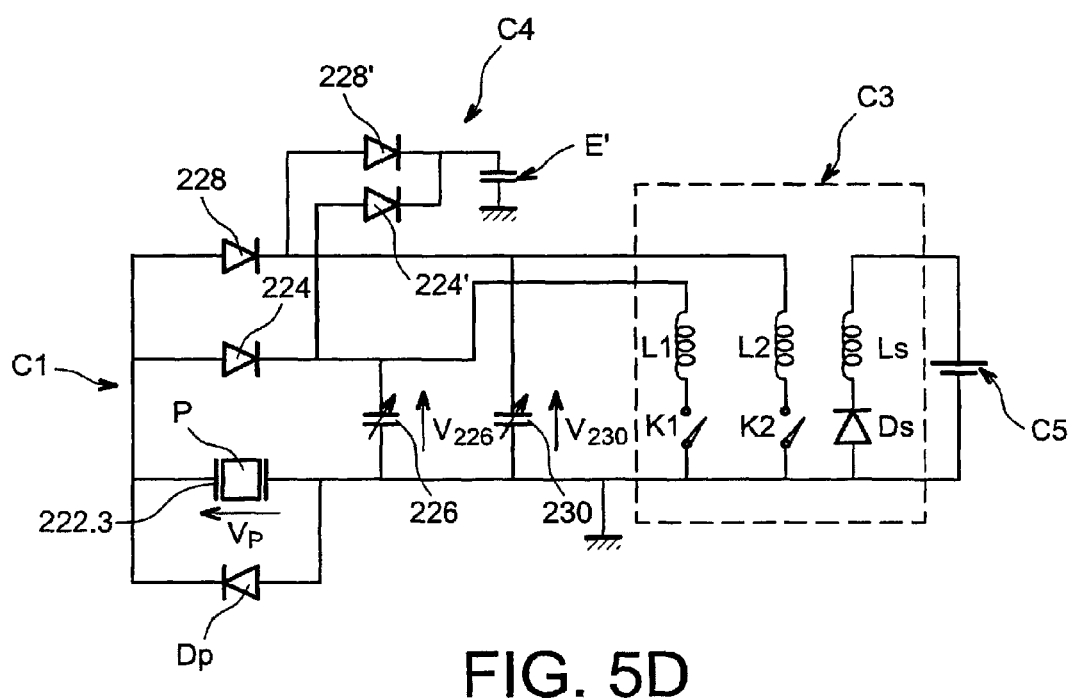
FIG. 5D is an example of an electrical diagram corresponding to the device of FIG. 5A.

FIG. 5D shows an electrical circuit adapted to the mechanical structure of the circuit of FIG. 5A.

In addition to the circuit shown in FIG. 1B, it comprises an example of a circuit C3 for discharging the electrical energy recovered by conversion of the mechanical energy to an electrical energy storage unit C5, and advantageously a circuit of a secondary electrical source C4 to actuate the start of the discharge circuit C3.

The discharge circuit C3 is connected in parallel to the circuits C1 and C2. The discharge circuit comprises a switch K1, K2 in series with a coil L1, L2, respectively in parallel with the circuit C1, C2. It also comprises, connected to the switch K1, K2 a diode $D_S$ and a coil $L_S$ in series with the storage unit C5. The terminals L1, L2 and $L_S$ also have the same magnetic circuit.

A diode $D_P$ is also mounted in parallel with the piezo-electric element P.

The circuit of the secondary source C4 comprises, for example two diodes 224' and 228' connected to the diodes 224 and 228 and to a source E' that may be recharged by the diodes 224' and 228'.

Every time that the capacity $C_{226}$ or $C_{230}$ reaches a maximum value $C_{226max}$ or $C_{230max}$, the piezo-electric element P also reaches maximum deformation and produces a positive voltage Vp capable of recharging the capacitor 226, 230 whose capacity has reached its maximum value.

The energy of the injected charge is then amplified by the drop in the value of the capacity of the pre-charged capacitor 226, 230 or the increase in the voltage at the terminals of the capacitor 226, 230, in the same way as for the device of FIG. 1A.

When the voltage at the terminals of the capacitor 226, 230 reaches a maximum value, its electrical energy is then transferred to the storage unit C5 by means of the discharge circuit C3, by closing, for one quarter of a resonance period ($L1C_{226}$ or $L2C_{230}$), the corresponding switch K1, K2. The potential electrical energy acquired by the capacitor 226, 230 is then transferred to the discharge circuit C3 via the switch K1 or K2, then from the discharge circuit C3 to the storage unit C5 via the diode $D_S$.

If when started the storage unit C5 is empty, the energy required to control the switches K1 and K2 may be provided by the secondary source E' which charges naturally with the diodes 224' and 228'. Next, as soon as the storage unit C5 has reached a sufficient voltage, it may power the control of these switches.

The role of the diode Dp is to re-inject into the electrode 222.3 of the piezo-electric element P, the charges previously transferred to the capacitor 226 or 230.

To minimise the losses, the diodes are preferably chosen with a low threshold, low resistance when they allow current to pass and high impedance in inverted voltage, for example they may be Schottky type diodes. The transistors are preferably chosen with low resistance when they allow current to pass, very high impedance in the open state and low parasite capacity, for example they may be transistors of the MOSFET or JFET type.

As concerns the piezo-electric element, the material used, its thickness and its length are chosen so that they are capable of providing sufficient voltage and current to pre-charge the electrostatic structure comprising the circuits C1 and C2, and that they preferably provide a resonance of the electrostatic structure within the frequency range of mechanical vibrations or relative movements that are sought to be recovered.

The piezo-electric material may be chosen among the ceramics: PZT ($PbZrtiO_3$) or PLZT (with lanthane) or $BaTiO_3$, among the nano-crystals (PZN-PT or PMN-PT), among the polymers (PVDF) or the AFCs (Active Fibre Composites).

The magnetic circuit of the inductive transformer is chosen so that it can store the energy acquired by the capacitor 226 or 230 during a cycle. The number of windings of the coil L1, L2 and Ls fitted to this magnetic circuit is such that the charge/discharge times of the magnetic circuit are negligible with respect to the mechanical period of the relative movement. This number of windings moreover depends on the value of $C_{226min}$, $C_{230min}$ and the voltage at the terminals of the storage unit C5.

It is possible for example that the resonance period of the circuits $L1C_{226min}$ and $L2C_{230min}$ is of the order of a microsecond, which is to say very low with respect to that of mechanical vibrations which have a period of several milliseconds.

Based on the dimensions of the device provided above, we will determine the energy that may be recovered by the device according to the invention.

The capacitive surface area of the capacitor 226 or 230 is equal to:

$$S = 46*0.4*1 = 18.4 \text{ mm}^2$$

$$C_{226min} = C_{230min} = \in_0 S/d_{max} = \in_0 * 18.4 \text{ mm}^2/50 \text{ μm} = 3.3 \text{ pF}$$

$$C_{226max} = C_{230max} = \in_0 S/d_{min} = \in_0 * 18.4 \text{ mm}^2/1 \text{ μm} = 162.7 \text{ pF}$$

$d_{max}$ and $d_{min}$ are respectively the maximum and minimum gaps between two teeth of the $C_{226}$ and $C_{230}$ capacitors during movement.

If the resonance frequency is also considered as being equal to $f_r = 50$ Hz, then the global stiffness k of the piezo-electric elements with respect to a movement according to the Z axis of the moving part 202 is equal to:

$$k = M(2\pi f_r)^2 = 10^{-3}(2\pi 50)^2 = 98.7 \text{ N/m}.$$

The energy that is mechanically available in a cycle where A is the amplitude of the relative movement is equal to $E_{dispo} \approx \frac{1}{2} kA^2$.

In the most favourable case (that which generates the most energy), A is equal to $(d_{max} - d_{min})/P = 24.5$ μm.

Therefore: $E_{dispo} \approx \frac{1}{2} kA^2 = \frac{1}{2} * 98.7 * (24.85 * 10^{-6})^2 = 29.6$ nJ.

The energy that is electrically convertible in a cycle by the electrostatic structure is equal to:

$$E_C = \frac{1}{2} \frac{C_{max}}{C_{min}} (C_{max} - C_{min}) V_{charge}^2 = 4.10^{-9} V_{charge}^2$$

If we want the electrically convertible energy to be equal to the energy available mechanically, which correspond to damping close to 1: $E = E_{dispo}$, therefore $V^2_{charge} = 2.7$ V.

The energy to be injected into the electrostatic structure ($C_{226}$ or $C_{230}$) to carry out the pre-charge is equal to:

$$E_{pre-charge} = \frac{1}{2} C_{max} V_{charge}^2 = 0.6 \text{ nJ}.$$

It is therefore sufficient for the piezo-electric elements to be capable, for a relative amplitude movement of 24.5 μm to produce, during each cycle, energy of 0.6 nJ with 2.7 V, which corresponds to energy that is 49 times less than that which will be converted by the electrostatic structure. It therefore appears that in this case the only role of the piezo-electric beams is to start the operation of the electrostatic conversion structure.

As the electrical energy converted by the piezo-electric elements only represents 2% of the mechanical energy available, the choice of the piezo-electric materials may thus be made by mainly taking account of their compatibility with the microelectronic manufacturing technologies used.

The power that may be recovered with such a system at 50 Hz and full amplitude is:

$P_{recoverable50Hz} = 29.6 \cdot 10^{-9} * 2 * 50 = 2.96$ µW, as there are two cycles per mechanical period, one cycle with the capacitor $C_{226}$ and one cycle with the capacitor $C_{230}$.

This invention permits a gain of 20% in efficiency with respect to a purely electrostatic system.

Figure 6:
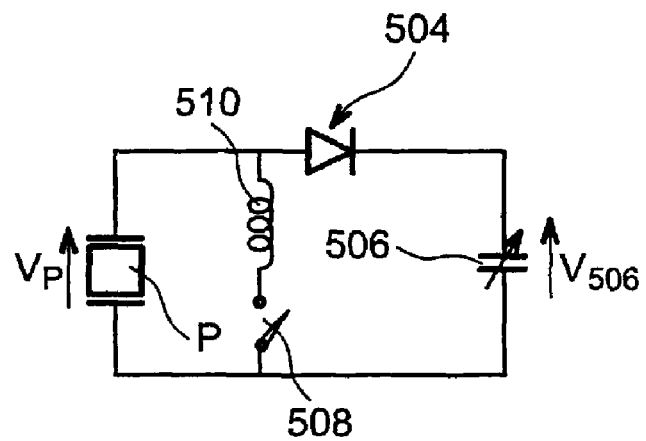
FIG. 6 is an example of an electrical diagram corresponding to another embodiment of this invention.

FIG. 6 shows a diagram of an electrical circuit that may be used to use the association of synchronised piezo-electric and electrostatic elements according to one advantageous embodiment of the invention.

The circuit comprises a piezo-electric element P, a diode 504, a capacitor 506 of variable capacity $C_{506}$, a switch 508 and a coil 510 in parallel with the piezo-electric element P. The voltage at the terminals of the piezo-electric element P is $V_P$ and the voltage at the terminals of capacitor 506 is $V_{506}$.

In this case we consider that the capacity of the capacitor 506 increases when Vp drops inversely.

This embodiment provides for the actuation of the switch 508 to inverse the voltage at the terminals of the piezo-electric element and to improve the efficiency of the device.

When the voltage Vp is at maximum, the voltage at the terminals of the piezo-electric element P may be inverted by closing the switch 508 for a half-resonance period of the circuit formed by the coil 510 and the capacity of the piezo-electric element P. This inversion of the sign of the charges stored in the piezo-electric element P causes the appearance of a mechanical braking force which permits the energy converted in the next cycle to be increased. This cycle corresponds to the phase in which the voltage Vp drops. Then, when the voltage Vp is at minimum, the switch 508 is again closed for a half-resonance period causing an inversion of the polarity of the voltage Vp and, by means of the diode 504, charging of the capacitor 506 when it is at maximum. Then, when the capacity $C_{506}$ drops, its potential electrical energy increases up to a maximum value before it is transferred totally or partially to the application to be powered in a very short space of time with respect to the variation period of the capacity $C_{506}$. Residual energy may be left in the capacitor 506, so that the voltage Vp starts the next cycle with a value that is not zero.

Figure 7:
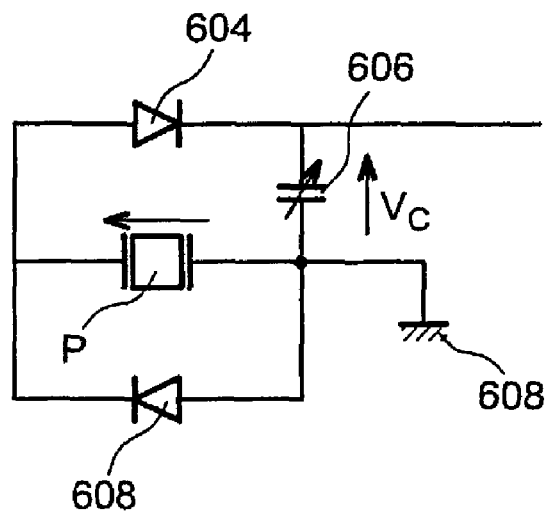
FIG. 7 is an example of an electrical diagram corresponding to another embodiment of this invention.

FIG. 7 shows a diagram of an electrical circuit of another advantageous embodiment of the invention, permitting the conversion device to be started without supplying energy.

The circuit comprises a piezo-electric element P mounted, in parallel with a diode 604 and a capacitor 606, and also in parallel with a diode 608.

The piezo-electric element P and the capacitor 606 are connected by one of their terminals to a mass potential 610. The capacitor 606 is connected by its other terminal to a discharge circuit.

It is supposed that the voltage Vp at the terminals of the piezo-electric element increases, when the capacity $C_{606}$ of the capacitor 606 increases and vice versa.

When the voltage Vp increases, the diode 604 allows current to pass and charges the capacitor 606 until the voltage Vp reaches a maximum value. Then, when the capacity $C_{606}$ drops, the charge that has been transferred to the capacitor 606 is amplified. When this potential electrical energy is at maximum, it is transferred, via a discharge circuit, to an application to be powered or a storage unit.

The introduction of the diode 608 permits, when the voltage Vp is normally negative, to recharge the capacity Cp of the piezo-electric element P in order to increase the maximum value of the voltage Vp during its positive cycle.

Figure 8:
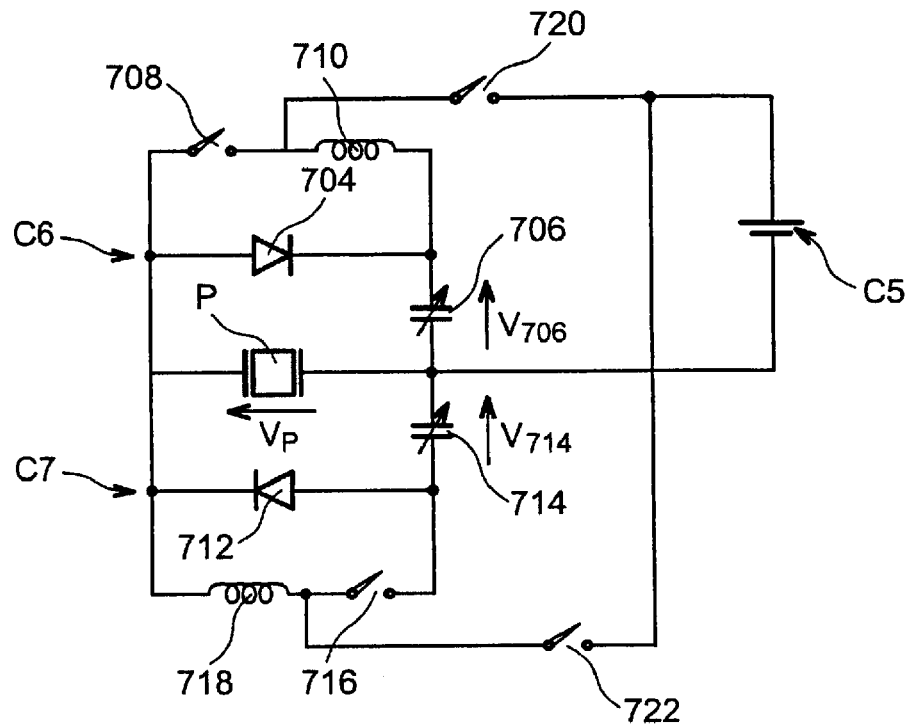
FIG. 8 is an example of an electrical diagram corresponding to another embodiment of this invention.

FIG. 8 shows an electrical diagram of one advantageous embodiment of the invention, which allows the piezo-electric element to be made active for the recovery of energy.

Rendering the piezo-electric element active during the energy recovery means, within the scope of this application, similarly to the electrostatic conversion, that an electrical charge is injected into the piezo-electric element so as to create a piezo-electric force which opposes its deformation. By thus creating a force which opposes the movement, the energy converted in a cycle by the piezo-electric element increases significantly with respect to a totally passive operation.

The circuit of FIG. 8 comprises a first circuit C6 and a second circuit C7. The first circuit C6 comprises a piezo-electric element P, a diode 704, a capacitor 706, a switch 708 and a coil 710. The switch 708 and the coil 710 are mounted in parallel with the diode 704.

The second circuit C7 comprises the piezo-electric element P, a diode 712, a capacitor 714, a switch 716 and a coil 718 mounted in parallel with the diode 712. The switch 708 and the coil 710 are mounted in parallel with the diode 704.

The piezo-electric element P is connected to a storage unit C5. The first circuit C6 between the switch 708 and the coil 710 and the second circuit C7 between the switch 716 and the coil 718 are connected to the storage unit C5 by a switch 720, 722 respectively.

When all of the switches 708, 716, 720, 722 are open, the circuit operates like that of FIG. 1B. This configuration permits the system to be started, which is to say that, when the voltage Vp at the terminals of the piezo-electric element increases, the capacitor 706 is charged, then, when the capacity of the capacitor 706 drops, the voltage $V_{706}$ at the terminals of the capacitor increases. Then, when the voltage $V_{706}$ is at maximum, instead of completely discharging the electrostatic structure to the storage unit C5, part of the electrical energy is transferred to the piezo-electric element P. For this purpose, the switch 708 is closed, which has the effect of establishing a current between the capacitor 706 and the piezo-electric element P. This circulation of current permits the voltage Vp to be inverted and thus create a mechanical braking force at the piezo-electric element P. Finally, part of the total electrical energy (stored in the piezo-electric element, the capacitor 706 and the coil 710) may be sent back to the storage unit by opening the switch 708 and by closing the switch 720, until the current circulating between the circuit C6 and the storage unit C5 is cancelled out.

It may be noted that, due to the presence of the diode 704, the capacitor 706 may not be completely discharged if the capacity of the piezo-electric element Cp is not to be completely discharged, in order to start the following cycle with a polarisation not equal to zero. This is not a problem as long as this voltage Vp remains low compared to the maximum value of the voltage $V_{706}$. The closing time of the switch 708 may be set according to the polarisation value desired at the piezo-electric element P and the energy that is to be transferred to the storage unit C5 at each cycle. Due to the symmetry of the structure, a similar operation exists via the C7 circuit, when the piezo-electric element moves in the other direction similarly to the device of FIG. 1A.

Figure 9:
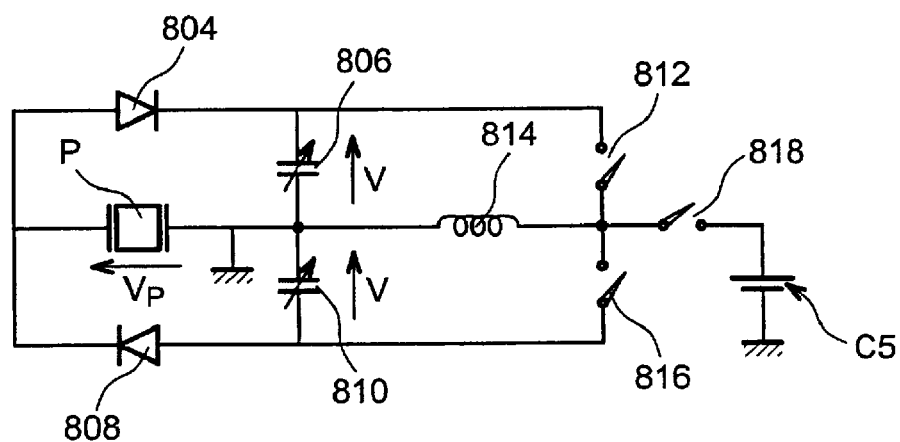
FIG. 9 is an example of an electrical diagram corresponding to another embodiment of this invention.

FIG. 9 shows a diagram of an electrical circuit of another advantageous variant of the invention in which the piezo-electric element is used solely as an initial source of energy, wherein the energy is then amplified in several steps via the variable capacities of the electrostatic structure.

The circuit comprises a first circuit C9 and a second circuit C10. The circuit C9 comprises a piezo-electric element P, a diode 804 and a capacitor of variable capacity 806.

The second circuit C10 comprises a piezo-electric element P, a diode 808 and a capacitor of variable capacity 810.

The capacitor 806 is mounted in parallel with a switch 812 and a coil 814.

The capacitor 810 is mounted in parallel with a switch 816 and the coil 814.

The coil 814 is also connected to a storage unit C5 by means of a switch 818.

Initially, the voltage $V_{806}$ at the terminals of the capacitor 806 is zero. When the voltage at the terminals of the piezo-electric element Vp becomes positive, there is an initial charge of the capacitor 806, then the energy associated to this charge is amplified by the drop in the capacity of the capacitor 806. When the capacity of the capacitor 806 reaches its minimum value, which is to say when the voltage $V_{806}$ is at maximum, the potential electrical energy of the capacitor 806 is transferred, first of all to the inductance 814, by closing the switch 812, then from the inductance 814 to the capacitor 810, by closing the switch 816. Furthermore, given that when the capacity of the capacitor 806 is at minimum, the capacity of the capacitor 810 is maximum, there is another increase of the potential electrical energy during the drop in the capacity of the capacitor 810.

The time to transfer the energy from one capacity to the other during the mechanical period are considered as negligible, which is to say that the resonance frequencies of the circuit formed by the coil 814 and the capacitor 806 and the circuit formed by the coil 814 and the capacitor 810 are much higher than the mechanical oscillation frequency of the moving part. Then, when the potential energy of the capacitor 810 reaches its maximum value, its energy is transferred to the capacitor 806.

The transfers between the two capacitors 806, 810 continue until the amplification level becomes sufficient. In each mechanical period, the excess energy is transferred to a storage unit C5. This may be carried out using the energy temporarily stored in the coil 816, then transferred partially or totally to the storage unit C5 by closing the switch 818.

Due to the symmetry of the layout, the initial charge may be made by the second circuit, with a negative voltage Vp at the terminals of the piezo-electric element.

This device has the advantage of starting with a very low voltage in the piezo-electric element, of the order of a few tenths of volts (voltage slightly higher than the threshold voltages of the diodes 806 and 810).

The operation of the devices, especially that of FIG. 2A, has been described considering a compression force, but the conversion of energy applied in the form of a traction force designed to move the layers 410, 412 apart is also possible.

This invention is not restricted to micro-systems, it also applies to metric sized systems and nano-metric sized systems.

The invention claimed is:

1. A method for converting mechanical energy into electrical energy, by at least one piezoelectric element and at least one first capacitor of variable capacity, the method comprising:

a) mechanically deforming the piezoelectric element;
b) recovering charges produced by the mechanically deforming of the piezoelectric element;
c) transferring charge from the piezoelectric element to the first capacitor;
d) modifying capacity of the first capacitor by mechanical deformation of the first capacitor;
e) recovering at least part of the electrical energy; and
f) transferring the electrical energy produced by the capacitor to a second capacitor and vice versa until a predetermined level of amplification of the electrical energy is reached.

2. A method of claim 1, wherein the a) mechanically deforming of the piezoelectric element and the d) modifying the capacity of the first capacitor are simultaneous.

3. A method of claim 2, wherein the a) mechanically deforming of the piezoelectric element is at a maximum when the capacity of the first capacitor is at a maximum.

4. A method according to claim 1, wherein the piezoelectric element and the first capacitor are deformed by a same mechanical constraint.

5. A method according to claim 1, wherein part of the electrical energy stored by the first capacitor is transmitted to the piezoelectric element.

6. A method according to claim 1, wherein the charges are transferred to the first or the second capacitor as a function of a direction of deformation of the piezoelectric element.

7. A method according to claim 1, wherein, when a voltage at terminals of the piezoelectric element is at a maximum, a sign of the voltage is inverted so as to create a mechanical braking force permitting energy converted in a following conversion cycle to be increased.

8. A method according to claim 1, wherein an excess quantity of energy with respect to the predetermined level of amplification is transferred to a storage or operational unit.

9. A method according to claim 8, wherein the c) transferring charge is controlled by a diode or a switch including a control circuit.

10. A device for converting mechanical energy into electrical energy, comprising:
at least one piezoelectric element;
at least a first capacitor of variable capacity and a second capacitor of variable capacity, the first and second capacitors having capacities varying inversely;
means for controlling transfer of charges between the piezoelectric element and the first capacitor and the second capacitor, such that charge produced during a deformation of the piezoelectric element is transmitted to the first capacitor or to the second capacitor to generate electrical energy that is amplified by variation of its capacity,
wherein the capacity of the first capacitor or the second capacitor is modified by moving armatures of the first capacitor or armatures of the second capacitor; and
means for transferring electrical energy produced by the first capacitor or the second capacitor to the second capacitor or the first capacitor respectively and vice versa until a predetermined level of amplification of the electrical energy is reached.

11. A device according to claim 10, wherein the means for controlling transfer of charges includes at least one diode or at least one switch including a control circuit.

12. A device according to claim 11, wherein the piezoelectric element and the armatures of the capacitor are substantially parallel to each other so that they are subjected to a same mechanical constraint.

13. A device according to claim 10, further comprising a part that moves by application of a mechanical constraint, fitted with teeth on either side of its axis of movement, wherein
- two fixed parts also including teeth move opposite the teeth of the moving part,
- the piezoelectric elements are perpendicular to movement of the moving part and are electrically connected to the moving part, and
- the pairs of opposite teeth form two sets of capacitors in series whose capacities vary inversely.

14. A device according to claim 10, wherein the piezoelectric element is in a form of a flexible membrane suspended at a distance from an electrostatic electrode, so that the electrostatic electrode and a second electrode of the piezoelectric element form a capacitor of variable capacity by deformation of the membrane.

15. A device according to claim 10, comprising a stratified structure in which a capacitor is formed by an alternation of first electrodes with a first potential, layers of electrically isolating material, and second electrodes with a second potential, the electrically isolating material being elastically deformable, and wherein the piezoelectric element forms a layer of the stratified structure.

16. A device according to claim 10, comprising
- a layer of piezoelectric material, and
- a first and a second electrode on either side of the layer of piezoelectric material.

17. A device according to claim 10, wherein the piezoelectric material is one of ceramics PZT ($PbZrTiO_3$) or PLZT (with lanthane) or $BaTiO_3$, nano-crystals PZN-PT or PMN-PT, or polymers (PVDF) or AFCs (Active Fiber Composites).

* * * * *